(12) United States Patent
Keys, II et al.

(10) Patent No.: US 9,228,322 B2
(45) Date of Patent: Jan. 5, 2016

(54) DRIVE SYSTEM FOR VEHICLE PULLING A TOWED IMPLEMENT

(71) Applicant: Deere & Company, Moline, IL (US)

(72) Inventors: Gary S. Keys, II, Cedar Falls, IA (US); John W. Regenauer, Waterloo, IA (US); Matthew J. Harris, Waterloo, IA (US); Brian A. Rodrigue, Thibodaux, IA (US); Clayton P. Neumann, Cedar Falls, IA (US); Zachary Kail, Cedar Falls, IA (US); Joe L. Schutte, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 106 days.

(21) Appl. No.: 13/971,199

(22) Filed: Aug. 20, 2013

(65) Prior Publication Data

US 2015/0053488 A1    Feb. 26, 2015

(51) Int. Cl.
*B60L 11/06* (2006.01)
*E02F 9/20* (2006.01)
(Continued)

(52) U.S. Cl.
CPC .............. *E02F 9/2075* (2013.01); *B60L 11/14* (2013.01); *B60L 15/2054* (2013.01); *E02F 3/6454* (2013.01); *E02F 3/651* (2013.01); *E02F 9/2079* (2013.01); *B60K 6/105* (2013.01); *B60L 2200/40* (2013.01); *B60L 2240/12* (2013.01); *B60L 2240/423* (2013.01); *B60L 2240/443* (2013.01); *F02D 41/1497* (2013.01)

(58) Field of Classification Search
CPC ...... B60K 17/356; B60K 6/365; B60K 6/445; B60K 6/547; B60K 6/46; B60K 6/52; B60K 6/105; B60K 6/48; B60K 1/00; F02F 3/651; F02F 3/6454; F02D 41/1497; B60L 3/12; B60L 7/16; B60L 11/06; B60L 11/18; B60L 15/2045; H02P 5/46; H02P 5/74; H02J 1/00; B60W 10/06; B60W 10/08; B60W 10/115; B60W 20/00; E02F 3/6454; E02F 3/6481; E02F 3/651; E02F 3/655; E02F 9/2253; B62D 59/04

See application file for complete search history.

(56) References Cited

U.S. PATENT DOCUMENTS 2,393,621 A * 1/1946 Adams ........................... 180/6.5
4,207,691 A * 6/1980 Hyler et al. ..................... 37/413
(Continued)

FOREIGN PATENT DOCUMENTS

EP      2418403 A1 * 2/2012

OTHER PUBLICATIONS

International Search Report and the Written Opinion of the International Searching Authority, application No. PCT/US14/51669, dated Dec. 4, 2014 (7 pages).

*Primary Examiner* — Joseph Rocca
*Assistant Examiner* — Daniel Yeagley

(57) ABSTRACT

A drive and control system is provided for a towing vehicle pulling a towed implement, such as a tractor pulling a scraper. The drive system includes a diesel engine which drives a generator for generating electric power. A tractor axle drive motor is connected to driven wheels of the tractor through a transmission. An assist drive motor is drivingly connected to driven wheels of the scraper. A power distribution unit controls distribution of electric power from the generator to the tractor and implement assist drive motors. A control unit controls the power distribution unit as a function of an operator set power split, and other sensed parameters. A one-way clutch prevents over-speed of the assist drive motor.

7 Claims, 3 Drawing Sheets

(51) Int. Cl.
  *E02F 3/64* (2006.01)
  *E02F 3/65* (2006.01)
  *B60L 11/14* (2006.01)
  *B60L 15/20* (2006.01)
  *F02D 41/14* (2006.01)
  *B60K 6/10* (2006.01)

(56) References Cited

U.S. PATENT DOCUMENTS

| | | | | |
|---|---|---|---|---|
| 4,471,611 | A | * | 9/1984 | Watanabe ................... 60/274 |
| 4,699,236 | A | * | 10/1987 | Morisawa et al. ............ 180/249 |
| 5,432,413 | A | * | 7/1995 | Duke et al. .................. 318/139 |
| 5,895,435 | A | * | 4/1999 | Ohta et al. ................... 701/59 |
| 6,205,379 | B1 | * | 3/2001 | Morisawa ............... B60L 11/14 180/165 |
| 7,350,611 | B2 | * | 4/2008 | Betz et al. ................. 180/69.3 |
| 8,051,916 | B2 | * | 11/2011 | Bright et al. ..................... 172/3 |
| 8,297,384 | B2 | | 10/2012 | Wanger et al. |
| 8,323,144 | B1 | | 12/2012 | Bin et al. |
| 9,008,877 | B2 | * | 4/2015 | Ando ................... F02D 41/1497 180/65.275 |
| 9,028,362 | B2 | * | 5/2015 | He ......................... B60K 6/105 477/3 |
| 9,045,028 | B2 | * | 6/2015 | Ichikawa ........... B60H 1/00207 |
| 2008/0314658 | A1 | * | 12/2008 | Atarashi et al. ............ 180/65.2 |
| 2009/0078521 | A1 | | 3/2009 | Ohtomo |
| 2010/0018727 | A1 | * | 1/2010 | Carlton et al. .................... 172/1 |
| 2010/0018728 | A1 | * | 1/2010 | Bright et al. ..................... 172/3 |
| 2010/0252339 | A1 | | 10/2010 | Bibeau et al. |
| 2014/0139016 | A1 | * | 5/2014 | Lovercheck et al. .......... 307/9.1 |

\* cited by examiner

DRIVE SYSTEM FOR VEHICLE PULLING A TOWED IMPLEMENT

FIELD OF THE INVENTION

The present disclosure relates to a drive and control system for a vehicle pulling a powered implement.

BACKGROUND OF THE INVENTION

A tractor pulling a scraper is an example of a towing vehicle pulling a towed implement. Earth moving scrapers are heavy and often operate in soil conditions where getting power to the ground can be a challenge. The weight carried by the scraper tires provides the potential for developing tractive power to assist the towing vehicle in moving the machine. If this additional tractive potential can be utilized, the drawbar pull needed from the tractor while loading the scraper and climbing steep grades can be reduced. The operational advantage gained by employing a tractive axle on the scraper linked to a traction control system can be substantial. First, the system will develop better traction for the overall system which will lead to faster pan fills and moving more dirt in less time. Secondly, there will be less wear on the tractor tires and drivetrain due to reduced wheel slip and drawbar load. Thirdly, this reduction in the maximum drawbar load allows ballast to be removed from the tractor and lowers the parasitic losses due to the rolling resistance of the entire tractor-scraper system. This will allow for higher transport speeds and a more productive operation while providing a fuel economy advantage during the entire cycle. Lastly, the system will increase the equipment's utilization by allowing operations in conditions where a normal tractor-scraper system would become stuck.

SUMMARY

According to an aspect of the present disclosure, a drive system is provided for a towed implement which pulled by a towing vehicle. The drive system includes a power generating unit on the towing vehicle, such as a diesel engine which drives a generator for generating electric power. The towing vehicle drive motor is drivingly connected to driven wheels of the towing vehicle. A second assist drive motor is drivingly connected to driven wheels of the towed implement. A power management unit controls the distribution of electric power from the generator to the towing vehicle and to implement drive motors.

A control system controls the distribution of electric power to the towing vehicle and to the towed implement. Power distribution is controlled as a function of manual inputs or by automatic closed loop control modes. A one-way clutch provides electric motor over-speed protection. Such a system could be used with many types of towed implements or implements, such as grain carts, slurry tanks, air seeder carts, etc., where extra traction is needed.

DETAILED DESCRIPTION OF THE DRAWINGS

Figure 1:
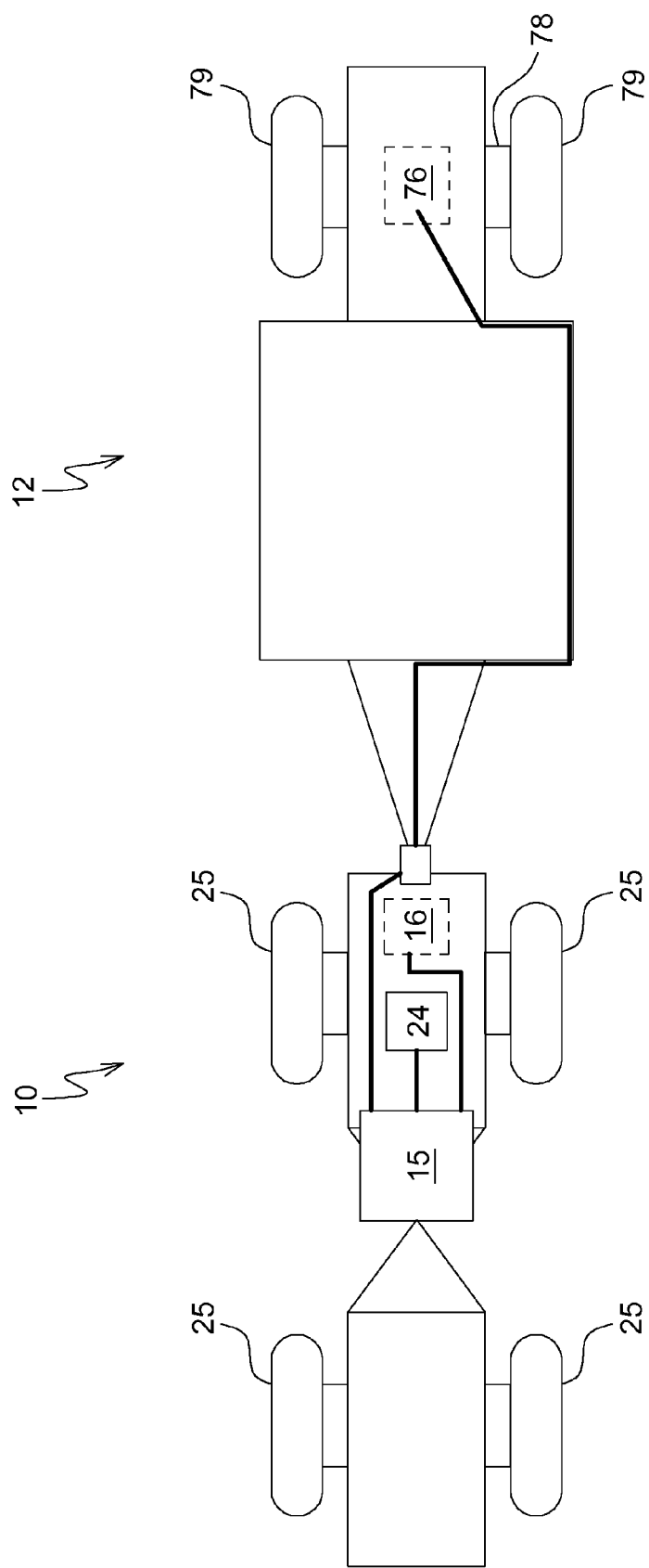
FIG. 1 is a simplified schematic diagram of a drive system embodying the invention.
Figure 2:
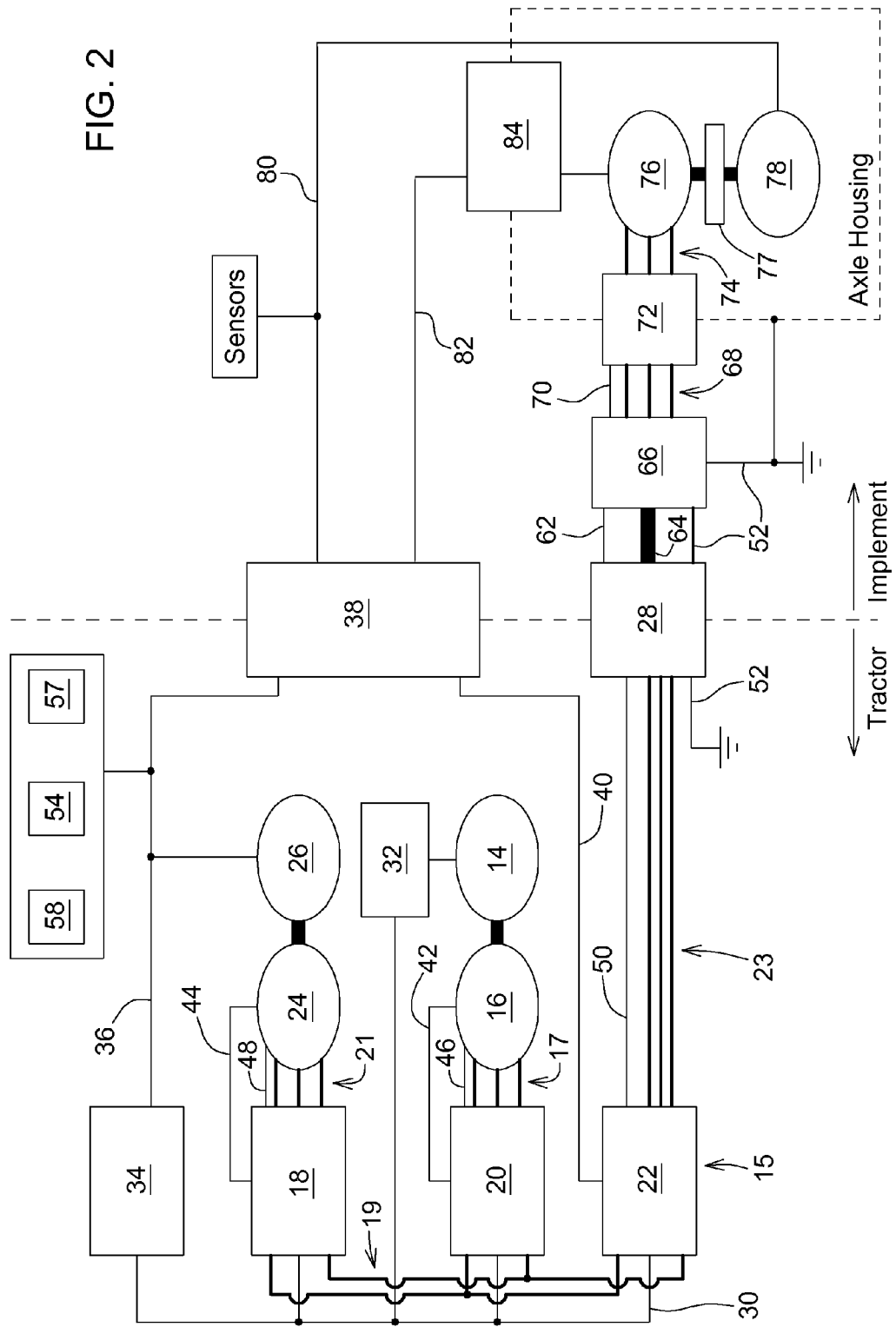
FIG. 2 is a simplified schematic electrical diagram of the drive system of FIG. 1.

Referring to FIGS. 1 and 2, a drive system is provided for a towing vehicle or tractor 10 which pulls an implement 12. The towing vehicle 10 may be an agricultural tractor. The towed implement 12 may be a pull-type scraper. The tractor 10 includes an engine 14, such as a Diesel engine, which drives the tractor axles as well as an electric generator 16. The generator 16 provides electrical power to power electronics units 15. The power electronics units 15 distributes electrical power to traction motor units 24 and 76 which drive corresponding vehicle wheels 25 and 79. Alternatively, the tractor 10 may have an engine which drives a generator that powers electric wheel motors (not shown) which provide power to driven wheels of the tractor. Alternatively, instead of a diesel engine driving a generator, the tractor 10 may have a known fuel cell (not shown) and power electronics for generating electrical power. Thus, this would require a tractor 10 with some type of electric drive train. This would normally be a Diesel electric system somewhat similar to a locomotive. The prime mover could be any type of combustion engine or fuel cell of adequate capacity, and the electric power would normally be used to power the drive axles of the tractor 10.

The towed implement 12 includes an electric assist or implement traction motor 76 which receives electrical power from the power electronics unit 15. The assist motor 76 drives an axle 78 which drives wheels 79 of the towed implement 12.

Referring to FIG. 2, the electrical generator 16 is coupled by 3-phase wiring 17 to a power electronics unit 15 which includes electrical power inverters 18, 20 and 22. Inverter 18 is coupled by a DC bus 19 to inverter 20 and inverter 22. Inverter 20 is operatively coupled by 3-phase wiring 21 to a traction motor 24 which is coupled to a transmission 26, such as a 2-speed transmission which is driving coupled to driven wheels 25 of the towing vehicle 10. Inverter 22 is coupled by 3-phase wiring 23 to a 3-phase connector 28 which electrically connects the power electronics of the towing vehicle 10 to the implement traction motor of the towed implement 12.

Control wiring 30 connects inverters 18-22 to each other, a transmission controller 34, to the power management unit 58. Control wiring 36 connects transmission controller 34 to the 2-speed transmission 26 and to a control connector 38 which electrically connects the control electronics of the towing vehicle 10 to the control electronics of the towed implement 12. Control wiring 40 connects inverter 22 to the control connector 38. Control wiring 42 connects inverter 20 to generator 16. Control wiring 44 connects inverter 18 to the traction motor 24.

An interlock wiring 46 connects inverter 20 to generator 16. An interlock wiring 48 connects inverter 18 to motor 24. An interlock wiring 50 connects inverter 22 to connector 28. Ground wiring 52 connects the 3-phase connector 28 to equipotential ground points. The power management unit 58 obtains the engine load factor from the engine control unit 32, the power split from the operator controlled power split setting unit 54 and the vehicle speed sensor 57.

Referring now to the towed implement portion of FIG. 2, the 3-phase connector 28 is connected by ground wiring 52, by interlock wiring 62 and by 3-phase AC wiring 64 to an interface box 66. Interface box 66 is connected by a 3-phase AC wiring 68 and by interlock wiring 70 to a high current connector 72. The connector 72 is connected by 3-phase AC wiring 74 to the towed implement traction motor 76, which is drivingly connected to the driven axle 78 of the towed implement 12.

A one-way clutch 77 is coupled between the traction motor 76 and the driven axle 78. Because the towed implement axle 78 has such a high drive ratio, once the vehicle reaches higher speeds (say 11 mph), the towed implement axle 78 must be disengaged from the electric motor 76 to prevent motor damage by over speeding. The one-way clutch 77 is used to accomplish this and will disengage the electric motor 76 from the towed implement axle 78 automatically.

Control connector 38 is connected by control lines 80 and 82 and connector 84 to the traction motor 76 and to the towed implement axle 78. The control connector 38 is also connected by control line 80 to towed implement and vehicle sensors which sense parameters such as electric motor temperatures, electric motor/generator speeds, implement wheel speeds, implement wheel slip (uses radar/gps and axle speeds to calculate) and ground speed.

Figure 3:
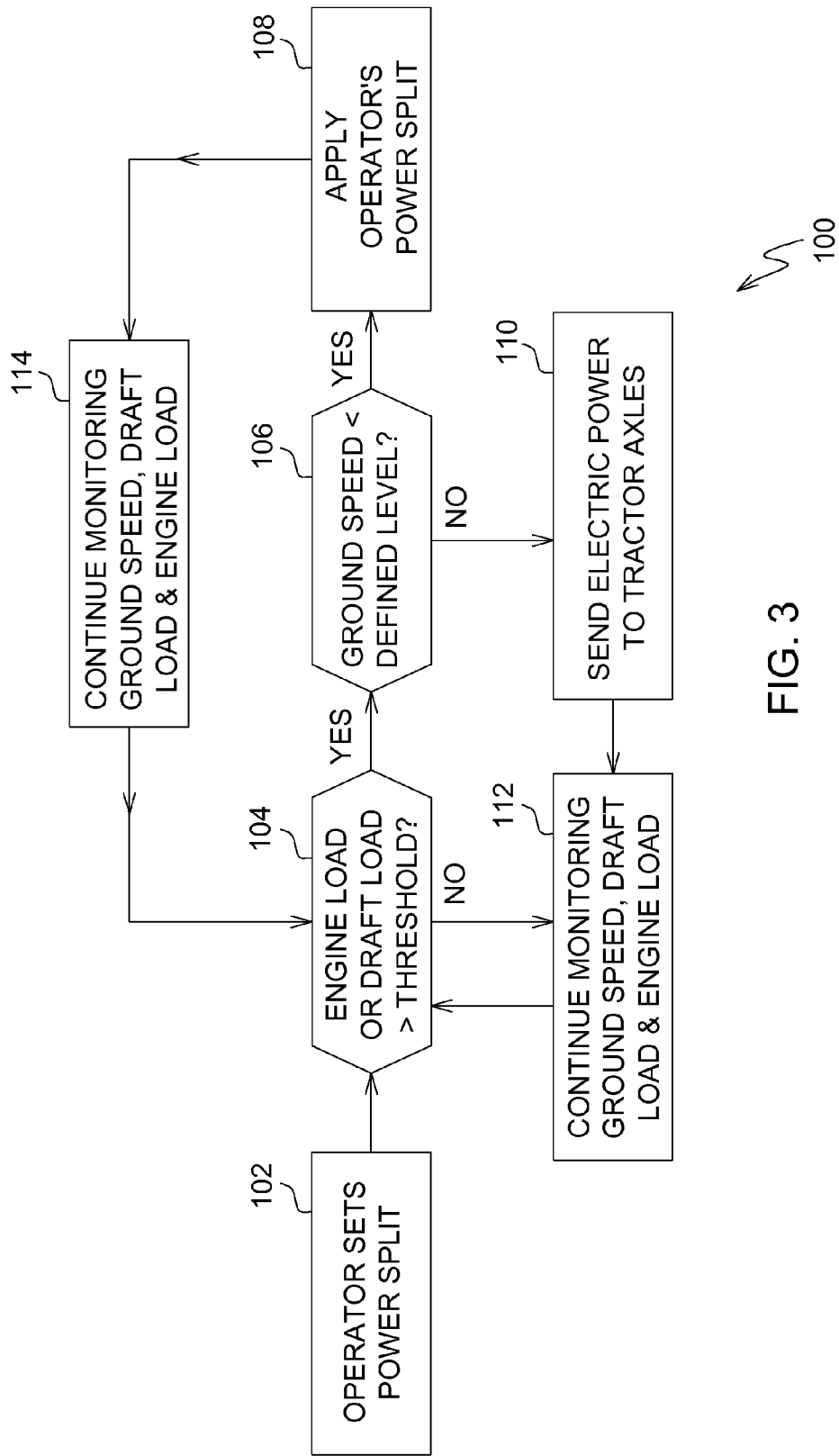
FIG. 3 is a flow chart of an algorithm performed by the power management unit of FIG. 2.

The power management unit 58 executes an algorithm 100 represented by FIG. 3. The conversion of this flow chart into a standard language for implementing the algorithm described by the flow chart in a digital computer or microprocessor, will be evident to one with ordinary skill in the art.

In step 102 the PMU 58 obtains a power split value which is set by the operator, and which determines the split of electric power between the tractor 10 and the towed implement 12. The operator preferably takes note of the site conditions. and based on experience, determines how much electric power should be provided to the towed implement 12. Typically, the more loose or slippery the condition (say mud or sand), more power would be shifted to the towed implement to help improve the overall traction. On clay soil where traction is good, less power would need to be shifted from the tractor axles to the towed implement as the tractor would experience less wheel slip. The inputting of the power split is done through setting unit 54, which may be a touch screen or rotary dial.

In step 104, the PMU 58 monitors ground speed, engine load and/or draft load and determines when to generate electric power and distribute it. If engine load and/or draft load exceeds a stored lower threshold, then electric power will begin to be generated, and the power could be shared between the tractor 10 and the towed implement 12, if a speed parameter is met. Electric power will continue to increase, and if an upper threshold is exceeded, then full electric power is commanded and is available to drive either the tractor axle, the scraper axle or any distribution in between as chosen by the operator.

Step 106 directs control to step 108 if sensed ground speed is less than a stored threshold. Step 106 directs control to step 110 if sensed ground speed is not less than a stored threshold.

Step 108 distributes electrical power to the tractor drive motor 24 and to the towed implement traction motor 76 according to the power split set by the operator using split setting unit 54. Thus, if the ground speed threshold is not exceeded, then the system will split the electric power between the tractor 10 and towed implement 12 as directed by the operator. Step 108 then directs the algorithm to step 114.

Step 110 distributes all the electrical power to the tractor drive motor 24. Thus, steps 106-110 operate to monitor ground speed from tractor axle sensors, radar, or by GPS, and if a threshold speed has been reached, all the electric power will be directed to the tractor 10. Otherwise, the electric power will be shared between the towed implement 12 and the tractor 10 as prescribed by the operator.

Step 112 continues to monitor ground speed, draft load and engine load and returns control to step 104.

Step 114 continues to monitor ground speed, draft load and engine load and returns control to step 104.

This system provides better traction, which leads to faster pan fills and more dirt moved in less time, if the towed implement is a scraper. There is also less wear on the tractor tires and drivetrain due to less wheel slip and reduced drawbar load. Also, in less than ideal ground conditions the operator will have increased equipment utilization because the equipment can be operated when it would normally not be operated.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A drive system for a towing vehicle pulling a towed powered implement, the drive system comprising:
    power generating unit, including a generator for generating electrical power;
    an electric drive motor connected to a driven axle of the towed implement;
    a manually operable power distribution setting unit;
    a vehicle speed sensor for generating a vehicle speed signal;
    a power distribution unit for controlling distribution of electric power from the generator to the towed implement drive motor; and
    a control unit connected to the setting unit, the speed sensor and the power distribution unit, the control unit controlling the power distribution unit in response to the setting unit and the vehicle speed signal;
    wherein if a sensed engine load is greater than a load threshold, then the control unit controls the power distribution unit as a function of sensed vehicle speed and the setting unit; and
    if a sensed engine load is not greater than the load threshold, the control unit continues to monitor sensed parameters.

2. The drive system of claim 1, wherein:
    a one-way clutch is coupled between the towed implement electric drive motor and the driven axle of the towed implement, the clutch disengaging to prevent overspeeding of the towed implement electric drive motor if vehicle speed exceeds a set speed level.

3. The drive system of claim 1, wherein:
    the towing vehicle comprises a tractor; and
    the towed implement comprises a scraper.

4. A drive system for a towing vehicle pulling a towed powered implement, the drive system comprising:
    power generating unit, including a generator for generating electrical power;
    an electric drive motor connected to a driven axle of the towed implement;
    a manually operable power distribution setting unit;
    a vehicle speed sensor for generating a vehicle speed signal;
    a power distribution unit for controlling distribution of electric power from the generator to the towed implement drive motor; and
    a control unit connected to the setting unit, the speed sensor and the power distribution unit, the control unit controlling the power distribution unit in response to the setting unit and the vehicle speed signal, wherein:
if a sensed engine load is greater than a load threshold and vehicle speed is less than a speed threshold, the control unit causes the power distribution unit to distribute electric power to the towing vehicle and to the towed implement drive motor as set by the setting unit; and
if a sensed engine load is greater than the load threshold and vehicle speed is not less than the speed threshold, the control unit causes the power distribution unit to distribute all electric power to the towing vehicle.

5. The drive system of claim 4, wherein:
a one-way clutch is coupled between the towed implement electric drive motor and the driven axle of the towed implement, the clutch disengaging to prevent overspeeding of the towed implement electric drive motor if vehicle speed exceeds a set speed level.

6. The drive system of claim 4, wherein:
the towing vehicle comprises a tractor; and
the towed implement comprises a scraper.

7. A drive system for a towing vehicle pulling a towed implement, the drive system comprising:
power generating unit, including a generator for generating electrical power;
a towed implement electric drive motor drivingly connected to a driven axle of the towed implement;
a one-way clutch coupled between the towed implement electric drive motor and the driven axle of the towed implement, the clutch disengaging to prevent overspeeding of the towed implement electric drive motor if vehicle speed exceeds a certain speed level;
a manually operable power distribution setting unit;
a vehicle speed sensor for generating a vehicle speed signal;
a power distribution unit for controlling distribution of electric power from the generator to the towed implement drive motor; and
a control unit connected to the setting unit, the speed sensor and the power distribution unit, the control unit controlling the power distribution unit in response to the setting unit and the vehicle speed signal, the control unit adjusts the power distribution unit as a function of sensed vehicle speed and the setting unit if a sensed engine load is greater than a load threshold, the control unit continuing to monitor sensed parameters if the sensed engine load is not greater than the load threshold, the control unit causing the power distribution unit to distribute electric power to the towing vehicle and to the towed implement drive motor as set by the setting unit if the sensed engine load is greater than the load threshold and vehicle speed is less than a speed threshold, and the control unit causing the power distribution unit to distribute all electric power to the towing vehicle if the sensed engine load is greater than the load threshold and vehicle speed is not less than the speed threshold.

\* \* \* \* \*